Figure 1:

S. A. FLOREN.
SEED TESTER.
APPLICATION FILED NOV. 6, 1915.

1,207,013.

Patented Dec. 5, 1916.

UNITED STATES PATENT OFFICE.

SIEGWART A. FLOREN, OF BISMARCK, NORTH DAKOTA, ASSIGNOR TO CARUGUSS MANUFACTURING CO., OF BISMARCK, NORTH DAKOTA, A CORPORATION OF ARIZONA.

SEED-TESTER.

1,207,013.   Specification of Letters Patent.   Patented Dec. 5, 1916.

Application filed November 6, 1915. Serial No. 60,014.

*To all whom it may concern:*

Be it known that I, SIEGWART A. FLOREN, a citizen of the United States, residing at Bismarck, in the county of Burleigh and State of North Dakota, have invented certain new and useful Improvements in Seed-Testers, of which the following is a specification, reference being had to the accompanying drawings.

This invention relates to certain improvements in seed testers, and it is an object of the invention to provide a novel and improved device of this general character whereby the germinating qualities of seed corn may be readily and conveniently determined.

The invention consists in the details of construction and in the combination and arrangement of the several parts of my improved seed tester whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in top plan of a seed tester constructed in accordance with an embodiment of my invention, with the pipe or cover removed; Fig. 2 is a transverse sectional view taken through my seed tester as herein embodied with a cover or top applied.

As disclosed in the accompanying drawings, 1 denotes a receptacle preferably rectangular in form and having its upper face open, said upper face being adapted to be substantially hermetically closed by the flanged cover 2. The receptacle 1 has arranged therein the perforated stand or support 6 having its marginal portions downturned, as at 7, to afford supporting flanges and adapted to contact with the side walls 4 of the receptacle 1 whereby the stand or support 6 is maintained against movement independently of the receptacle. The flanges 7 are each independent one of the other and possess a certain degree of inherent resiliency whereby the requisite coaction with the walls 4 of the receptacle is assured. Furthermore it is to be noted that the walls 4 are of a height in excess of the combined height of the stand or support 6 and the pad 3 resting thereon. An absorbent pad 3 is adapted to be placed upon the support or stand 6 and the cover 2 is provided with minute perforations 8, said perforations 8 being of a number materially less than the number of perforations within the stand or table 6. It is also to be observed that the openings 8 are of a diameter less than that of the perforations of the stand and which arrangement in practice has been found of material advantage. The supporting flanges 7 maintain the support or stand 6 a sufficient distance above the bottom of the receptacle 1ª so as to be positioned above the water placed within the receptacle 1.

In the use of the device the pad 3 is placed within the receptacle 1 and upon the stand or support 6 and is initially moistened or saturated. After the pad has been moistened one seed of whatever kind of grain it is desired to test is placed within each of the depressions 5 and whereupon the upper or open face of the receptacle 1 is closed by the cover 2. It will be perceived that the cover serves to maintain the moisture within the receptacle for a sufficient length of time for germination without any attention after the first operation, and it will be further perceived that the humidity arising from the water within the bottom of the receptacle 1 will serve to keep the pad moist throughout the length of time. In actual practice I have found that best results are obtained in four or five days. When the cover 2 is removed and five grains of seeds have not spouted, it will be understood that the seed is of 95 per cent. quality which would mean that the farmer should add 5 per cent. more of that seed to the usual amount sown per acre. This calculation is based on the fact that the depressions 5 are one hundred in number and preferably arranged in ten rows of ten depressions or pockets 5 as is clearly shown in Fig. 1 of the accompanying drawings.

From the foregoing description, it is thought to be obvious that a seed tester constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A seed tester comprising a receptacle impervious to moisture, a stand positioned within the receptacle and having its marginal portions downturned to afford supporting flanges, each of said flanges being independent of the other and adapted to contact with the bottom and side walls of the receptacle, said flanges being resilient, an absorbent pad positioned upon the upper face of the stand and provided in its top face with a plurality of depressions affording pockets adapted to contain seeds, and a movable cover for the container.

In testimony whereof I hereunto affix my signature in the presence of two witnesses.

SIEGWART A. FLOREN.

Witnesses:
F. E. McCurdy,
D. Filmoor.